United States Patent
Fujiwara et al.

(10) Patent No.: US 8,307,391 B2
(45) Date of Patent: Nov. 6, 2012

(54) INFORMATION PROCESSING APPARATUS AND METHOD

(75) Inventors: Nobuyuki Fujiwara, Kanagawa (JP); Motoki Tsunokawa, Chiba (JP); Tatsuya Narahara, Kanagawa (JP); Kazuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1242 days.

(21) Appl. No.: 10/508,803

(22) PCT Filed: Feb. 26, 2003

(86) PCT No.: PCT/JP03/02102
§ 371 (c)(1),
(2), (4) Date: Sep. 23, 2004

(87) PCT Pub. No.: WO03/081472
PCT Pub. Date: Oct. 2, 2003

(65) Prior Publication Data
US 2005/0160460 A1 Jul. 21, 2005

(30) Foreign Application Priority Data
Mar. 27, 2002 (JP) ................ P2002-089337

(51) Int. Cl.
*H04N 7/025* (2006.01)
*H04N 5/445* (2011.01)
(52) U.S. Cl. ........... 725/36; 725/46; 725/50; 725/51; 725/52
(58) Field of Classification Search ........... 725/39, 725/46, 50–52
See application file for complete search history.

(56) References Cited

U.S. PATENT DOCUMENTS
5,794,050 A  8/1998  Dahlgren et al.
6,169,543 B1 * 1/2001 Wehmeyer ................ 725/47
(Continued)

FOREIGN PATENT DOCUMENTS
JP  10-215419  8/1998
JP  11-261908  9/1999
WO  WO 97 08604  3/2007

OTHER PUBLICATIONS

Mandala R et al: Association for Computing Machinery: "Combining Multiple Evidence From Different Types of Thesaurus for Query Expansion" Proceedings of SIGIR '99. 22nd. International Conference on Research and Development in Information Retrieval. Berkeley, CA, Aug. 1999, Annual International ACM-SIGIR Conference on Research and Development in Information Retrieval, New York, NY: AC, Aug. 1999, pp. 191-197, XP000970716 ISBN: 1-58113-096-1.

(Continued)

*Primary Examiner* — Pankaj Kumar
*Assistant Examiner* — Franklin Andramuno
(74) *Attorney, Agent, or Firm* — Frommer Lawrence & Haug LLP; William S. Frommer; Thomas F. Presson

(57) ABSTRACT

An information processing apparatus and an information processing method for providing the results of searches of broadcast content. A search space processing section acquires a search keyword based on search information coming from a user terminal, and searches a search keyword dictionary database for search-related keyword data related to the search keyword. On the basis of the search keyword and search-related keyword data, the search space processing section generates a search keyword space and submits the generated space to a correction process. A search processing section compares the corrected search keyword space, EPG data, and an EPG keyword space for a match. A search display processing section prepares a list of display-ready information from the result of the matching and sends the list to the user terminal.

6 Claims, 18 Drawing Sheets

U.S. PATENT DOCUMENTS

| | | | |
|---|---|---|---|
| 6,247,010 B1* | 6/2001 | Doi et al. | 1/1 |
| 6,581,207 B1* | 6/2003 | Sumita et al. | 725/46 |
| 6,751,613 B1* | 6/2004 | Lee et al. | 707/5 |
| 7,620,965 B2* | 11/2009 | Miyazaki et al. | 725/42 |
| 2002/0010639 A1* | 1/2002 | Howey et al. | 705/26 |
| 2002/0024532 A1* | 2/2002 | Fables et al. | 345/700 |
| 2002/0052863 A1* | 5/2002 | Morikage et al. | 707/1 |
| 2003/0172382 A1* | 9/2003 | Kim | 725/53 |
| 2005/0273468 A1* | 12/2005 | Hermansen et al. | 707/100 |

OTHER PUBLICATIONS

Qui Y: "Automatic Query Expansion Based on a Similarity Thesaurus" Dissertation Submitted to the Swiss Federal Institute of Technology Zurich for the Degree of Doctor of Technical Sciences, XX, XX, 1995, pp. 1-127, XP002258389.

* cited by examiner

FIG. 7

| | CONTENT ID | CONTENT TITLE | BROADCAST STATION | BROADCAST DATE | BROADCAST START TIME | BROADCAST END TIME | GENRE | CONTENT INTRODUCTION |
|---|---|---|---|---|---|---|---|---|
| a1 | 0001 | OK ? | FUJI TV | 12/01 | 12:00 | 13:00 | VARIETY SHOW | AT NOON,.... |
| a2 | 0002 | WNS | TV TOKYO | 12/01 | 23:00 | 23:45 | OTHERS | THE CITY NEWS IS.... |
| a3 | 0003 | COOKING | NHK | 12/01 | 13:55 | 14:00 | COOKING | COOKING,.... |

FIG. 9A

| CONTENT ID | FORMAL TITLE | COMMON TITLE | POPULAR TITLE 1 | POPULAR TITLE 2 | ... |
|---|---|---|---|---|---|
| b1 — 0001 | IS IT OK TO LAUGH ? | OK ? | | | |
| b2 — 0002 | WORLD NEWS SATELLITE | WNS | WORLD NEWS | | |
| b3 — 0003 | FIVE-MINUTE COOKING | COOKING | 5-MIN. DISH | | |

FIG. 9B

| CONTENT ID | CAST NAME 1 | CAST NAME 2 |
|---|---|---|
| c1 — 0001 | TSUMORI | TAKIYA KIMURA |
| c2 — 0002 | MAOKO OGAWA | HEITARO OYAMA |
| c3 — 0003 | ICHIRO MIYAMOTO | |

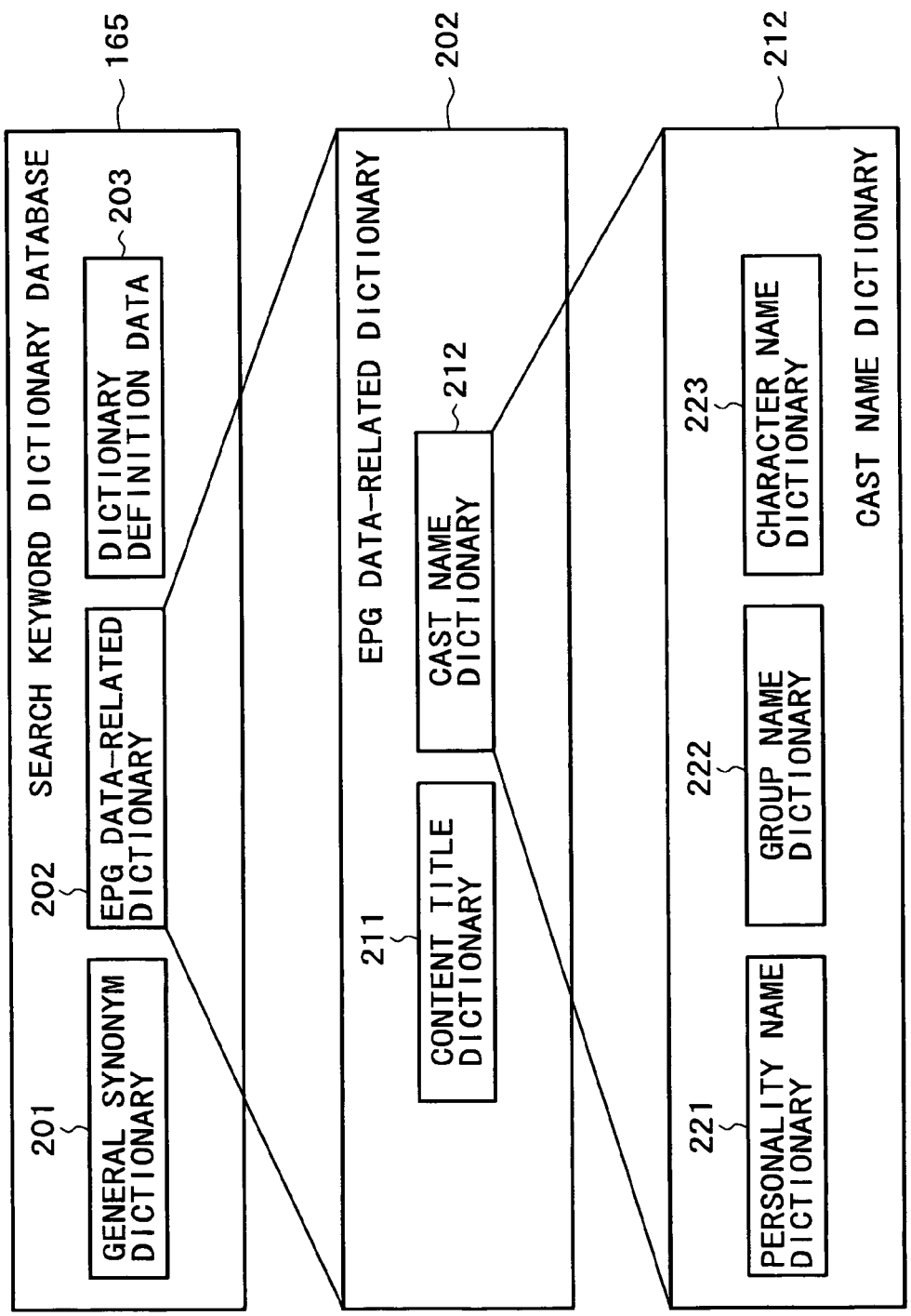

FIG. 11A

| FORMAL TITLE | COMMON TITLE | POPULAR TITLE 1 | POPULAR TITLE 2 | ... |
|---|---|---|---|---|
| d1 → WORLD NEWS SATELLITE | WNS | WORLD NEWS | | |

FIG. 11B

| FORMAL TITLE | COMMON TITLE | POPULAR TITLE 1 | POPULAR TITLE 2 | ... |
|---|---|---|---|---|
| e1 → KAZUYOSHI MORITSU | TSUMORI | | | |
| e2 → TAKIYA KIMURA | KIMUTAKI | TAKIYA | | |
| e3 → RINGO KATORI | RINGO | RINGO-MAMA | | |

FIG. 11C

| FORMAL TITLE | COMMON TITLE | POPULAR TITLE 1 | POPULAR TITLE 2 | ... |
|---|---|---|---|---|
| f1 → SNAP | SUNAPPU | | | |

FIG. 11D

| FORMAL TITLE | COMMON TITLE | POPULAR TITLE 1 | POPULAR TITLE 2 | ... |
|---|---|---|---|---|
| g1 → GINTARO YAJIMA | GINTARO | GIN-CHAN | | |
| g2 → RINGO-MAMA | MAMA | | | |

| GROUP NAME | PERSONALITY NAME 1 | PERSONALITY NAME 2 | PERSONALITY NAME 3 | ... |
|---|---|---|---|---|
| SNAP | TAKIYA KIMURA | RINGO KATORI | MASAHIRO NAKATA | ... | h1

INFORMATION PROCESSING APPARATUS AND METHOD

TECHNICAL FIELD

The present invention relates to an information processing apparatus and an information processing method. More particularly, the invention relates to an information processing apparatus and an information processing method for permitting simple and efficient searches for broadcast contents.

BACKGROUND ART

The recent popularization of personal computers among the general public has been accompanied by widespread use of full-text search systems over the Internet, such as Yahoo! (registered trademark) and Google (trademark). A typical full-text search system prompts a user to designate a keyword that is used by the system as a basis for searching the entire Internet or a designated range thereof for anything applicable to the designated keyword.

The full-text search scheme is also applied to broadcast content search systems that utilize EPG (Electronic Program Guide) data. EPG data is made up of content information such as broadcast content titles and introductions to content details. A full-text search by a typical broadcast content search system is illustratively aimed at searching the EPG data for content information about the broadcast content provided by the broadcast stations located in a user-designated area over a predetermined period of time starting from the day of search.

However, the total number of content tiles included in the PEG data applicable to the keyword search is typically as small as 4,000. Only 40 to 80 percent of the available broadcast content is covered by the content information. In addition, how much content information exists about the broadcast content varies according to genre. For example, large percentages of content information exist with respect to dramas, sports and movies; whereas only limited percentages of content information are available about documentaries.

The content information included in the PEG data is most often expressed in text form. Furthermore, each of the broadcast content titles in the EPG data is about 20 characters long in text, and the introductions to these content titles are less than 100 characters long in text each. That is, the numbers of the characters making up the content information (i.e., text length) are appreciably limited.

Because the EPG data is primarily constituted by article and stories derived from newspapers and magazines and turned into electronic form, large portions of the data have been semantically compressed for space reasons. (Illustratively, a "five-minute cooking session" is abbreviated to "cooking"). The semantic compression and abbreviation lead to numerous homonyms and acronyms being produced in the EPG data. When the user enters a keyword for a search, a large number of homonyms can thus be encountered in the content information in EPG.

Conventionally, as shown in FIG. 1, a typical broadcast content search system presupposes that a search keyword space 3 designated by the user with a search keyword 1 is identical to the search keyword 1 (i.e., search keyword 1=search keyword space 3). Since an EPG data space 4 (an aggregate of EPG data subject to searches) is not very large, the range of content titles actually retrieved by a search with the keyword 1 can be smaller than the user's expected space 2 which is an aggregate of search results hoped for by the user. That is, the number of broadcast content titles retrieved using the search keyword 1 can be significantly smaller than the number of broadcast content titles expected by the user. This state of affairs has obviously been disappointing to the user.

DISCLOSURE OF INVENTION

The present invention has been made in view of the above circumstances and provides an apparatus and a method for providing in a simplified manner the results of searches for broadcast content as expected by users.

In carrying out the invention and according to one aspect thereof, there is provided an information processing apparatus including: first generating means for generating a content information space based on content information and on additional information related to the content information; receiving means for receiving search information from an information processing terminal over a network; first acquiring means for acquiring a search keyword from the search information received by the receiving means; searching means for searching a search-related information database for information related to the search keyword acquired by the first acquiring means; second generating means for generating a search keyword space based on the related information retrieved by the searching means and on the search keyword; comparing means for comparing information in the content information space generated by the first generating means with information in the search keyword space generated by the second generating means; preparing means for preparing a list of display-ready information from the information deemed to match as a result of the comparison by the comparing means; and transmitting means for transmitting the list of display-ready information prepared by the preparing means to the information processing terminal.

Preferably, the information processing apparatus may further include updating means for updating the search-related information database on the basis of the content information space generated by the first generating means.

The preparing means may preferably prepare the list of display-related information from the matching information derived from the comparison by the comparing means, in accordance with the search information.

Preferably, the information processing apparatus may further include second acquiring means for acquiring the content information from another information processing apparatus over the network.

According to another aspect of the invention, there is provided an information processing method including: a first generation step of generating a content information space based on content information and on additional information related to the content information; a reception step of receiving search information from an information processing terminal over a network; an acquisition step of acquiring a search keyword from the search information received in the reception step; a search step of searching a search-related information database for information related to the search keyword acquired by in the acquisition step; a second generation step of generating a search keyword space based on the related information retrieved in the search step and on the search keyword; a comparison step of comparing information in the content information space generated in the first generation step with information in the search keyword space generated in the second generation step; a preparation step of preparing a list of display-ready information from the information deemed to match as a result of the comparison in the comparison step; and a transmission step of transmitting the list of display-ready information prepared in the preparation step to the information processing terminal.

According to a further aspect of the invention, there is provided a recording medium which records a program in a computer-readable format, the program including: a first generation step of generating a content information space based on content information and on additional information related to the content information; a reception controlling step of controlling receiving search information from an information processing terminal over a network; an acquisition step of acquiring a search keyword from the search information received in the reception controlling step; a search step of searching a search-related information database for information related to the search keyword acquired by in the acquisition step; a second generation step of generating a search keyword space based on the related information retrieved in the search step and on the search keyword; a comparison step of comparing information in the content information space generated in the first generation step with information in the search keyword space generated in the second generation step; a preparation step of preparing a list of display-ready information from the information deemed to match as a result of the comparison in the comparison step; and a transmission controlling step of controlling transmission of the list of display-ready information prepared in the preparation step to the information processing terminal.

According to an even further aspect of the invention, there is provided a program which controls a computer to execute: a first generation step of generating a content information space based on acquired content information and on additional information related to the content information; a reception controlling step of receiving search information from an information processing terminal over a network; an acquisition step of acquiring a search keyword from the search information received in the reception controlling step; a search step of searching a search-related information database for information related to the search keyword acquired by in the acquisition step; a second generation step of generating a search keyword space based on the related information retrieved in the search step and on the search keyword; a comparison step of comparing information in the content information space generated in the first generation step with information in the search keyword space generated in the second generation step; a preparation step of preparing a list of display-ready information from the information deemed to match as a result of the comparison in the comparison step; and a transmission controlling step of controlling transmission of the list of display-ready information prepared in the preparation step to the information processing terminal.

Where the information processing apparatus, information processing method, recording medium, and program according to the invention are in use, a content information space is first generated on the basis of acquired content information and of additional information related to the content information. Search information is then received from an information processing terminal over a network, and a search keyword is acquired from the search information thus received. A search is made through a search-related information database for information related to the acquired search keyword. A search keyword space is then generated based on the related information thus retrieved and on the search keyword. Information in the content information space is compared with information in the search keyword space. A list of display-ready information is prepared from the information deemed to match as a result of the comparison. The list of display-ready information thus prepared is then transmitted to the information processing terminal.

In the description that follows, the term "network" will refer to an arrangement on which at least two apparatuses are interconnected so that any one of them may transmit information to any of the other connected apparatuses. The apparatuses communicating with one another over the network may be either an independently established apparatus each or may be internal blocks that constitute a single apparatus.

BRIEF DESCRIPTION OF DRAWINGS

FIG. 7 is a tabular view explaining typical EPG data for the server in FIG. 2.

FIG. 9A is a tabular view explaining typical EPG keyword data for the server in FIG. 2.

FIG. 9B is a tabular view explaining other typical PEG keyword data for the server in FIG. 2.

FIG. 10 is a schematic view presenting a typical structure of search keyword dictionaries for the server in FIG. 2.

FIG. 11A is a tabular view explaining typical search-related keyword data found in the search keyword dictionaries shown in FIG. 10.

FIG. 11B is a tabular view explaining other typical search-related keyword data found in the search keyword dictionaries in FIG. 10.

FIG. 11C is a tabular view explaining other typical search-related keyword data found in the search keyword dictionaries in FIG. 10.

FIG. 11D is a tabular view explaining other typical search-related keyword data found in the search keyword dictionaries in FIG. 10.

BEST MODE FOR CARRYING OUT THE INVENTION

Preferred embodiments of this invention will now be described with reference to the accompanying drawings.

Figure 1:
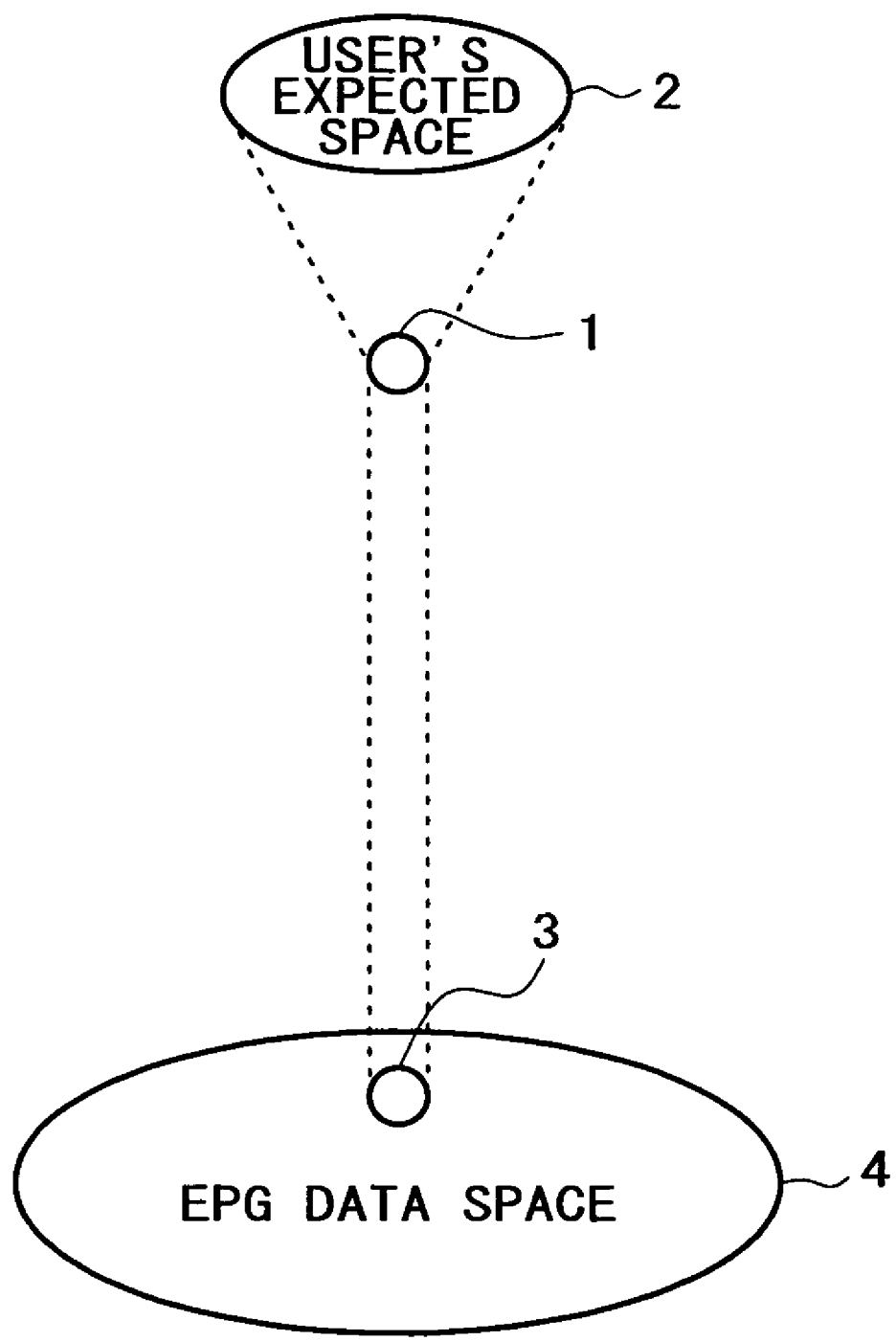
FIG. 1 is a schematic view explaining a conventional content information searching system.
Figure 2:
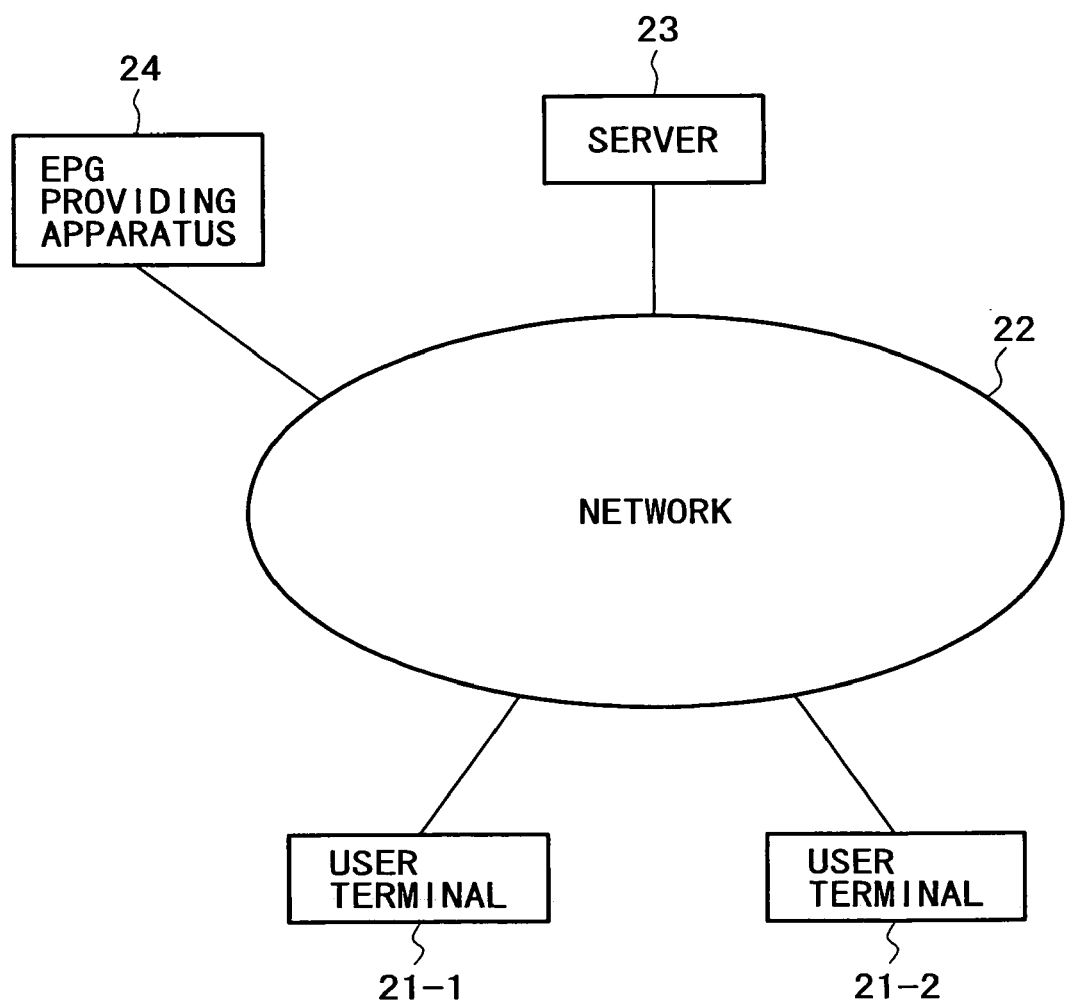
FIG. 2 is a schematic view showing a typical configuration of a content information providing system embodying this invention.

FIG. 2 is a schematic view showing a typical configuration of a content information providing system practiced as one preferred embodiment of this invention. User terminals 21-1 and 21-2 are connected to a network 22 exemplified by the Internet (wherever the user terminals need not be distinguished individually, they will be simply referred to as the user terminal 21 hereunder). Although the configuration in FIG. 2 shows only two user terminals configured, there may be any number of user terminals connected to the network 22 in practice.

A server 23 and an EPG (Electronic Program Guide) providing apparatus 24 are connected to the network 22. In practice, any numbers of servers 23 and EPG providing apparatuses 24 may be connected to the network 22.

The EPG providing apparatus 24 generates EPG data about contents to be broadcast by broadcast apparatuses, not shown. The generated EPG data is provided to the server 23 over the network 22. The EPG data typically include broadcast content titles and introductions to the contents.

The server 23 acquires the EPG data from the EPG providing apparatus 24. Given a search keyword designated from the user terminal 21, the server 23 searches the EPG data for relevant content information about the broadcast content to be broadcast by the broadcast apparatuses. After retrieving the relevant content information containing the keyword, the server 23 transmits list display information about the retrieved content information to the user terminal 21 over the network 22. This allows the user to obtain the information about desired broadcast content.

Figure 3:
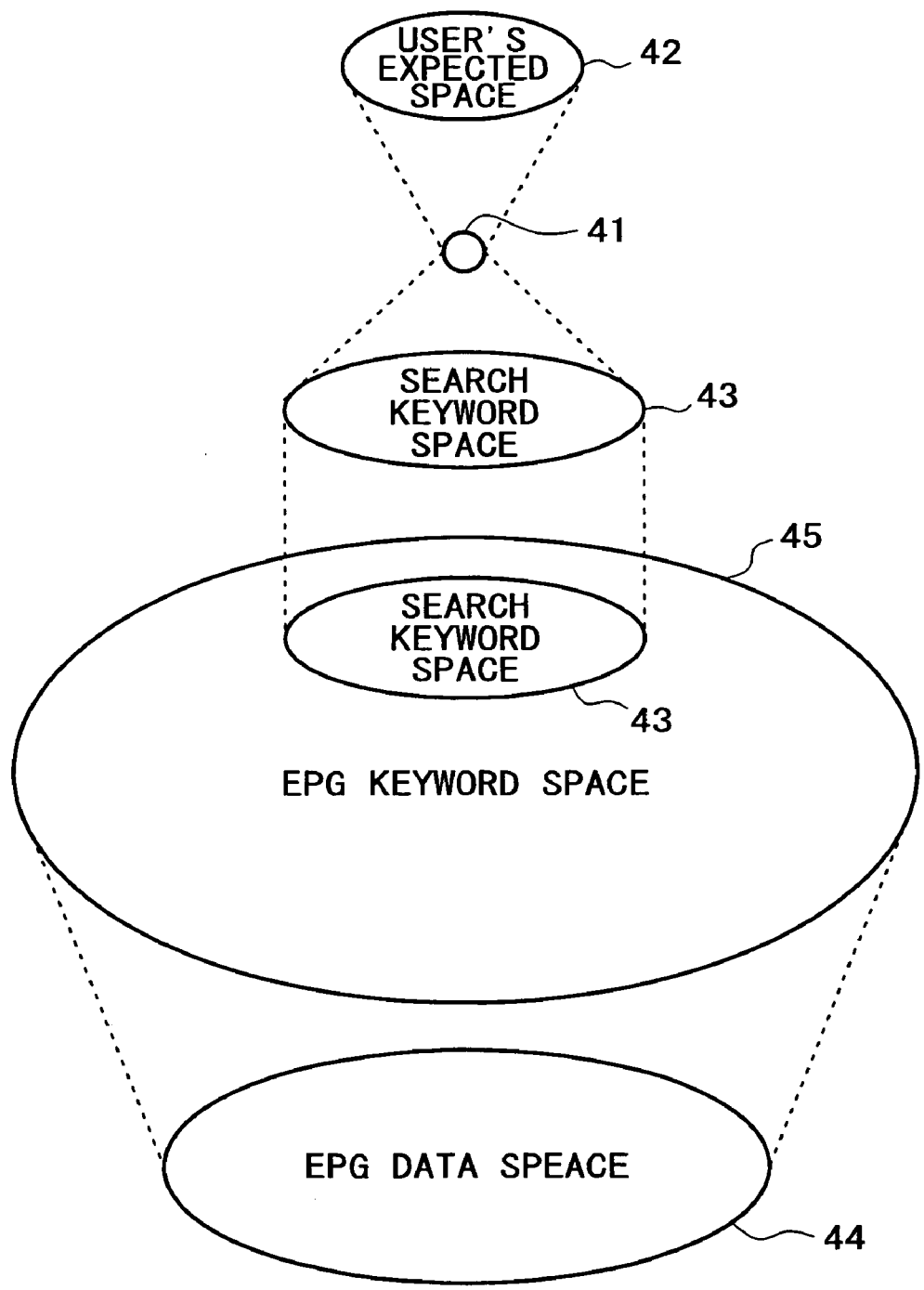
FIG. 3 is a schematic view explaining the content information providing system shown in FIG. 2.

The content information providing system of FIG. 2 is explained below with reference to FIG. 3. In order to search for desired broadcast content, the user possessing the user terminal 21 sends a search keyword 41 to the server 23 over the network 22. At this point, the user expects that a plurality of broadcast content titles will be retrieved according to the search keyword 41. An aggregate of the search results expected by the user is called the user's expected space 42 hereunder.

The server 23 searches a search keyword dictionary database (DB) 165 (FIG. 6) for search-related keyword data (related information) relevant to the search keyword 41 sent from the user. On the basis of the search keyword 41 and search-related keyword data thus acquired, the server 23 generates a search keyword space 43.

The server 23 also adds related EPG keyword data (additional information) to the EPG data acquired from the EPG providing apparatus 24, thus generating an EPG keyword space 45, an aggregate of the EPG data and EPG keyword data. It follows that an EPG data space 44, which is an aggregate of the EPG data alone, is included in the EPG keyword space 45.

The server 23 compares the search keyword space 43 with the EPG keyword space 45 for matching. On retrieving the keyword-including content information deemed to match, the server 23 provides the user with list display information about the retrieved content information.

In the manner outlined above, the server 23 provides the user terminal 21 with the list display information made up of the content information about numerous broadcast content titles.

Figure 4:
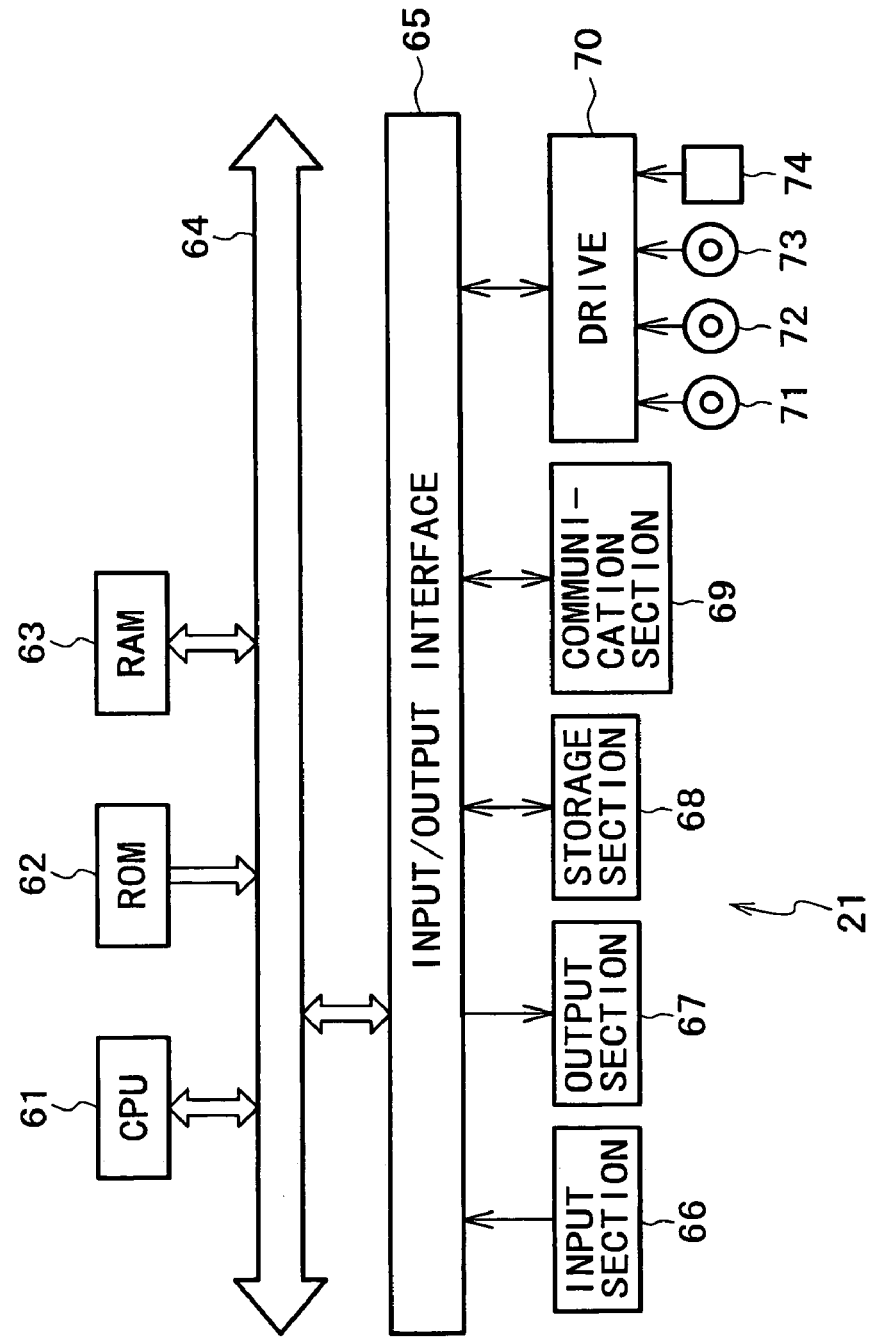
FIG. 4 is a block diagram depicting a typical structure of a user terminal included in FIG. 2.

FIG. 4 depicts a typical structure of the user terminal 21. In FIG. 4, a CPU (central processing unit 61) performs diverse processes in accordance with programs held in a ROM (Read Only Memory) 62 or with programs loaded from a storage section 68 into a RAM (Random Access Memory) 63. The RAM 63 may also accommodate data needed by the CPU 61 in executing its processing.

The CPU 61, ROM 62 and RAM 63 are interconnected via a BUS 64. The bus 64 is also connected to an input/output interface 65.

The input/output interface 65 is connected to an input section 66 including a keyboard and a mouse; an output section 67 formed by a display such as a CRT (Cathode Ray Tube) or an LCD (Liquid Crystal Display) and by speakers; a storage section 68 typically composed of a hard disk drive; and a communication section 69 constituted by a modem and/or a terminal adapter. The communication section 69 carries out communication processes over the network 22.

The input/output interface 65 is also connected to a drive 70 as needed. Typically, a magnetic disk 71, an optical disk 72, a magneto-optical disk 73, or a semiconductor memory 74 is loaded into the drive 70. Computer programs are read from the storage medium loaded in the drive 70 and installed into the storage section 68 as needed.

Figure 5:
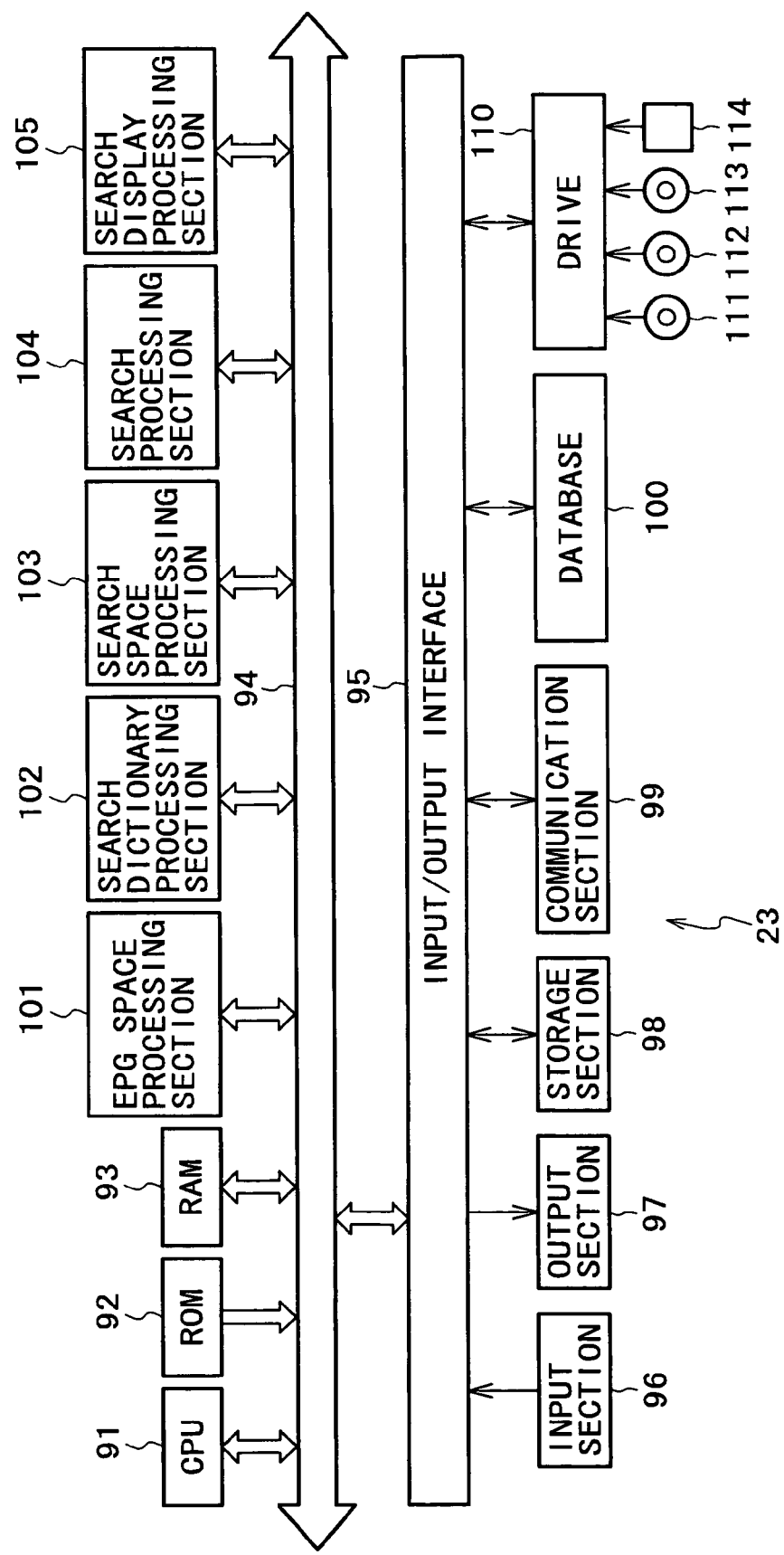
FIG. 5 is a block diagram illustrating a typical structure of a server included in FIG. 2.

FIG. 5 is a block diagram showing a typical structure of the server 23. In FIG. 5, the server 23 has components ranging from a CPU 91 to a communication section 99 which correspond respectively to the components ranging from the CPU 61 to the communication section 99 in the user terminal 21 of FIG. 4. The basic structure of the server 23 is the same as that of the user terminal 21 and thus will not be discussed further.

The bus 94 is also connected to an EPG space processing section 101, a search dictionary processing section 102, a search space processing section 103, a search processing section 104, and a search display processing section 105.

The EPG space processing section 101 generates an EPG keyword space 45 based on the EPG data acquired from the EPG providing apparatus 24 and on the EPG keyword data related to the acquired EPG data. The EPG keyword space 45 thus generated is stored into a database 100. In accordance with the data constituted by the generated EPG keyword space 45 (i.e., EPG data and EPG keyword data), the search dictionary processing section 102 updates the search keyword dictionary database 165 (FIG. 6) stored in the database 100.

Given the search keyword 41 sent by the user, the search space processing section 103 searches the search keyword dictionary database 165 in the database 100 for search-related keyword data. The search space processing section 103 then generates a search keyword space 43 made up of the search keyword 41 and search-related keyword data.

The search processing section 104 compares the search keyword space 43 with the EPG keyword space 45 for matching. Following the comparison, the search processing section 104 supplies the search display processing section 105 only with the keyword-including content information deemed to match. In turn, the search display processing section 105 prepares list display information for furnishing a list display of the matching content information, and transmits the list display information to the user terminal through the communication section 99.

The input/output interface 95 is also connected to the database 100. The database 100 includes an EPG database 162 (FIG. 6) that retains the EPG data acquired from the EPG providing apparatus 24, and the search keyword dictionary database 165 that is updated by the search dictionary processing section 102. Data is typically read by the CPU 91 from the database 100 and supplied to the relevant components of the server 23 as needed.

A drive 110 is attached to the input/output interface 95 if necessary. Illustratively, a magnetic disk 111, an optical disk 112, a magneto-optical disk 113, or a semiconductor memory 114 is loaded into the drive 110. Computer programs are read from the storage medium loaded in the drive 110 and installed into the storage section 98 as needed.

Figure 6:
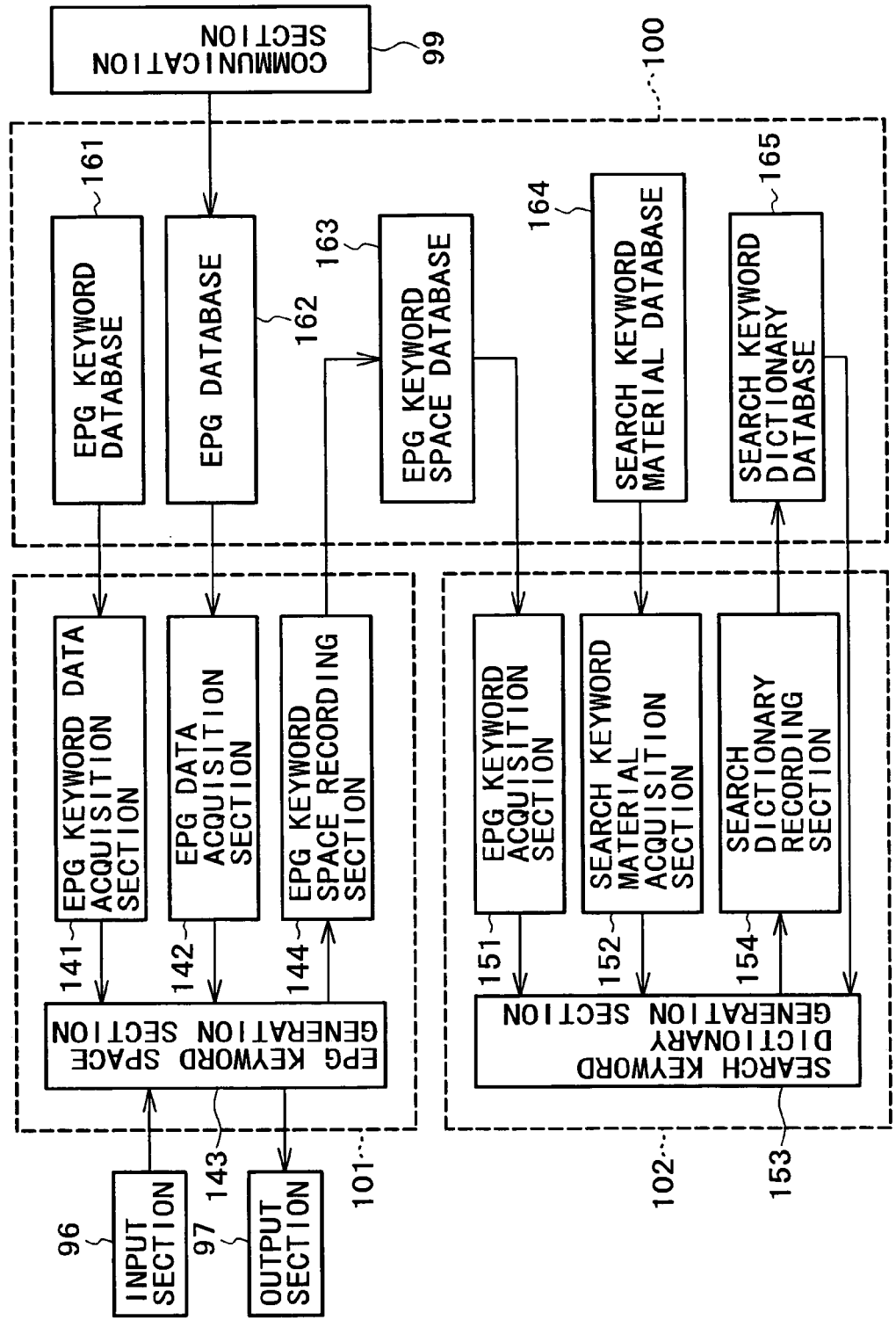
FIG. 6 is a block diagram indicating a typical functional structure of the server in FIG. 2.

FIG. 6 is a block diagram indicating a typical functional structure of the server 23. The functional blocks shown in FIG. 6 are implemented by the CPU 91 carrying out corresponding control programs.

In FIG. 6, the EPG space processing section 101 is made up of an EPG keyword data acquisition section 141, an EPG data acquisition section 142, an EPG keyword space generation section 143, and an EPG keyword space recording section 144. The search dictionary processing section 102 is formed by an EPG keyword acquisition section 151, a search keyword material acquisition section 152, a search keyword dictionary generation section 153, and a search dictionary recording section 154. The database 100 is constituted by an EPG keyword database 161, an EPG database 162, an EPG keyword space database 163, a search keyword material database 164, and a search keyword dictionary database 165.

The server 23 periodically acquires EPG data from the EPG providing apparatus 24 through the communication section 99. The acquired EPG data is stored into the EPG database 162. The EPG data acquisition section 142 acquires the EPG data from the EPG database and supplies the acquire data to the EPG keyword space generation section 143.

FIG. 7 is a tabular view showing typical EPG data held in the EPG database 162. The EPG data is made of content information about a plurality of broadcast content titles. Each item of content information is in text form and is constituted by one or a plurality of keywords. In FIG. 7, a content information item al about a broadcast content title identified by a content ID "0001" indicates that the content title is "OK?," the broadcast station is "Fuji TV," the broadcast date is "12/01" (which means December 1st), the broadcast start time is "12:00" (which means twelve o'clock noon), the broadcast end time is "13:00," the genre is "Variety show," and the content introduction is "At noon, . . . "

Likewise, a content information item a2 about a broadcast content title identified by a content ID "0002" indicates that the content title is "WNS," the broadcast station is "TV Tokyo," the broadcast date is "12/01," the broadcast start time is "23:00," the broadcast end time is "23:45," the genre is "Others," and the content introduction is "The city news is . . . " A content information item a3 about a broadcast content title identified by a content ID "0003" indicates that the content title is "Cooking," the broadcast station is "NHK," the broadcast date is "12/01," the broadcast start time is "13:55," the broadcast end time is "14:00," the genre is "Cooking," and the content introduction is "For cooking, . . . "

The EPG keyword database 161 holds beforehand the EPG Keyword data related to the EPG data. The EPG keyword data is acquired by the EPG keyword data acquisition section 141 and supplied to the EPG keyword space generation section 143. Alternatively, the EPG keyword data may be input through the input section 96. As another alternative, the EPG keyword data may be acquired from an EPG keyword data providing apparatus, not shown, by the communication section 99 over the network 22.

Figure 8:
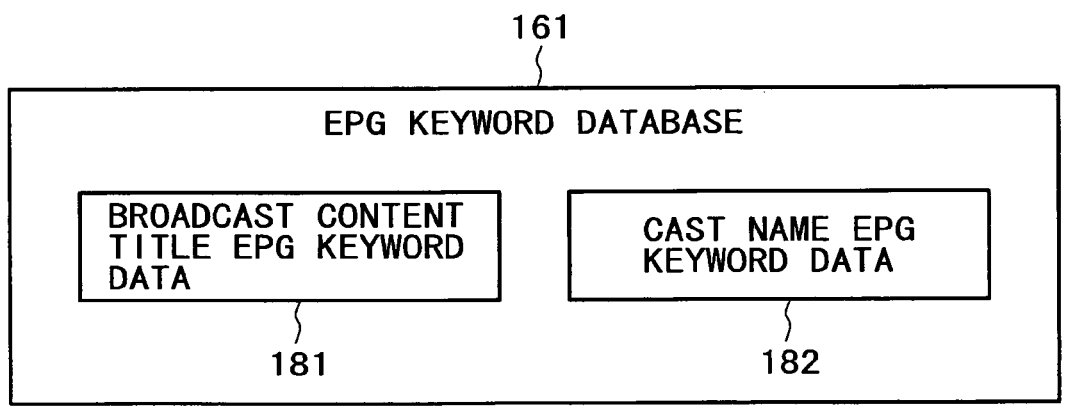
FIG. 8 is a schematic view explaining a typical structure of EPG keyword data for the server in FIG. 2.

FIG. 8 shows a typical structure of the EPG keyword database 161. The EPG keyword database 161 is formed by broadcast content title EPG keyword data 181 and by cast name EPG keyword data 182. The EPG keyword data include additional information related to a plurality of broadcast content titles. Each item of the additional information is composed of keywords.

FIG. 9A is a tabular view explaining typical broadcast content title EPG keyword data 181. In FIG. 9A, an additional information item b1 about a broadcast content title identified by a content ID "0001" indicates that a formal title is "Is it OK to laugh?" and a common title is "OK?" Likewise, an additional information item b2 about a broadcast content title identified by a content ID "0002" indicates that the formal title is "World news satellite," the common title is "WNS," and a popular title 1 is "World news." An additional information item b3 about a broadcast content title identified by a content ID "0003" indicates that the formal title is "Five-minute cooking," the common title is "Cooking," and the popular title 1 is "5-min. dish."

As described-above, a title (that may be called by viewers) related to the formal title of the broadcast contents is registered in the broadcast content title EPG keyword data 181 including a title described in the EPG data.

FIG. 9B is a tabular view explaining typical cast name PEG keyword data 182. In FIG. 9B, an additional information item c1 about cast names for a broadcast content title identified by a content ID "0001" indicates that a cast name 1 is "Tsumori" and a cast name 2 is "Takiya Kimura." Likewise, an additional information item c2 about cast names for a broadcast content title identified by a content ID "0002" indicates that the cast name 1 is "Maoko Ogawa" and the cast name 2 is "Heitaro Oyama." An additional information item c3 about cast names for a broadcast content title identified by a content ID "0003" indicates that the cast name 1 is "Ichiro Miyamoto."

In the manner described, the cast name EPG keyword data 182 cover the registered names of the cast for each broadcast content title. The registered names here include those omitted from the EPG data.

The EPG keyword space generation section 143 compares the EPG data with the EPG keyword data related to the data for matching, and causes the output section 97 to output the results of the comparison. The EPG keyword space generation section 143 then causes the EPG keyword space recording section 144 to record into the EPG keyword space database 163 the matching EPG keyword data and EPG data as an EPG keyword space 45 regarding the EPG data in question. The EPG keyword data include data that have been input by an administrator of the server 23 through the input section 96.

Illustratively, if a formal title "Five-minute cooking" is used as a search keyword 41 for a search, it is possible to retrieve the content information a3 (FIG. 7) including only the abbreviated title "Cooking" which was not retrieved conventionally during searches.

The EPG keyword acquisition section 151 acquires from the EPG keyword space database 163 the EPG keyword data and EPG data included in the newly recorded EPG keyword space 45. The acquired data is supplied to the search keyword dictionary generation section 153.

The search keyword material database 164 holds in advance a general synonym dictionary that has been input through the input section 96, the dictionary containing generally used synonyms. The data in this general synonym dictionary is fed from the search keyword material acquisition section 152 to the search keyword space generation section 153 as search keyword material data.

The search keyword dictionary generation section 153 acquires dictionary definition data 203 (FIG. 10) from the search keyword dictionary database 165. Based on the dictionary definition data 203 thus acquired, the search keyword dictionary generation section 153 records into the search keyword dictionary database 165 the EPG keyword data and EPG data in the newly recorded EPG keyword space 45, as well as the search keyword material data (general synonym dictionary data), as search-related keyword data.

FIG. 10 is a schematic view presenting a typical structure of the search keyword dictionary database 165. In the example of FIG. 10, the search keyword dictionary database 165 is constituted by a general synonym dictionary 201, an EPG data-related dictionary 202, and dictionary definition data 203.

The general synonym dictionary 201 holds as search-related keyword data the general synonym dictionary data that is supplied from the search keyword material acquisition section 152 to the search keyword dictionary generation section 153.

The EPG data-related dictionary 202 is formed by a content title dictionary 211 and a cast name dictionary 212. The cast name dictionary 212 is further made up of a personality name dictionary 221, a group name dictionary 222, and a character name dictionary 223. Each of these dictionaries contains the EPG keyword data and EPG data constituting the EPG keyword space 45 as search-related keyword data.

The dictionary definition data 203 is data that define the types of search-related keyword data stored in each of the dictionaries constituting the EPG data-related dictionary 202. On the basis of the dictionary definition data 203, the search keyword dictionary generation section 153 determines which of the dictionaries forming the EPG data-related dictionary 202 is to accommodate any newly recorded search-related keyword data (EPG keyword data and EPG data in EPG keyword space 45).

FIGS. 11A through 11D are tabular views explaining typical structures of the dictionaries constituting the EPG data-related dictionary 202. As shown in FIG. 11A, the content title dictionary 211 has the formal titles of broadcast content titles associated in storage with their common or popular names which have been commonly adopted through abbreviation or have simply become popular among viewers. For example, a formal title "World news satellite" in a search keyword data item d1 is associated with a common name "WNS" and a popular name 1 "World news" being stored.

The personality name dictionary 221, as shown in FIG. 11B, has the formal names of personalities, singers or other well-known people appearing in broadcast contents, associated in storage with their common or popular names which have been commonly adopted through abbreviation or have simply become popular among viewers. For example, a formal name "Kazuyoshi Moritsu" in a search-related keyword data item e1 is associated with a common name "Tsumori" being stored. A formal name "Takiya Kimura" in a search-related keyword data item e2 is associated with a common name "Kimutaki" and a popular name 1 "Takiya" in storage. A formal name "Ringo Katori" in a search-related keyword data item e3 is associated with a common name "Ringo" and a popular name 1 "Ringo-mama" being stored.

The group name dictionary 222, as depicted in FIG. 11C, has the formal names of groups to which the personalities appearing in broadcast content belong, associated in storage with common or popular group names which have been commonly adopted through abbreviation or have simply become popular among viewers. For example, a formal name "SNAP" in a search-related keyword data item f1 is associated with a common name "Sunappu" being stored.

The character name dictionary 223, as indicated in FIG. 11D, has the formal names of characters appearing in broadcast content (dramas, movies, etc.), associated in storage with common or popular character names which have been commonly adopted through abbreviation or have simply become popular among viewers. For example, a formal name "Gintaro Yajima" in a search-related keyword data item g1 is associated with a common name "Gintaro" and a popular name 1 "Gin-chan" being stored. A formal name "Ringo-mama" in a search-related keyword data item g2 is associated with a common name "Mama" in storage.

In each of the dictionaries, as described, the common and popular names which correspond to their formal counterparts and which have been acquired from all content information about the EPG data or EPG keyword data are recorded as search-related keyword data. The formal, common and popular names are stored in properly associated relation with one another.

How the EPG keyword space 45 is updated will now be described with reference to the flowchart of FIG. 12. The updating process is initiated by the CPU 91 of the server 23 causing the communication section 99 to acquire periodically the EPG data from the EPG providing apparatus 24 and storing the acquired data into the EPG database 162. In step S1 of FIG. 12, the EPG data acquisition section 142 acquires the EPG data from the EPG database 162 and sends the acquired data to the EPG keyword space generation section 143.

In step S2, the EPG keyword data acquisition section 141 acquires the EPG keyword data from the EPG keyword database 161. The acquire data is supplied to the EPG keyword space generation section 143.

Figure 13:
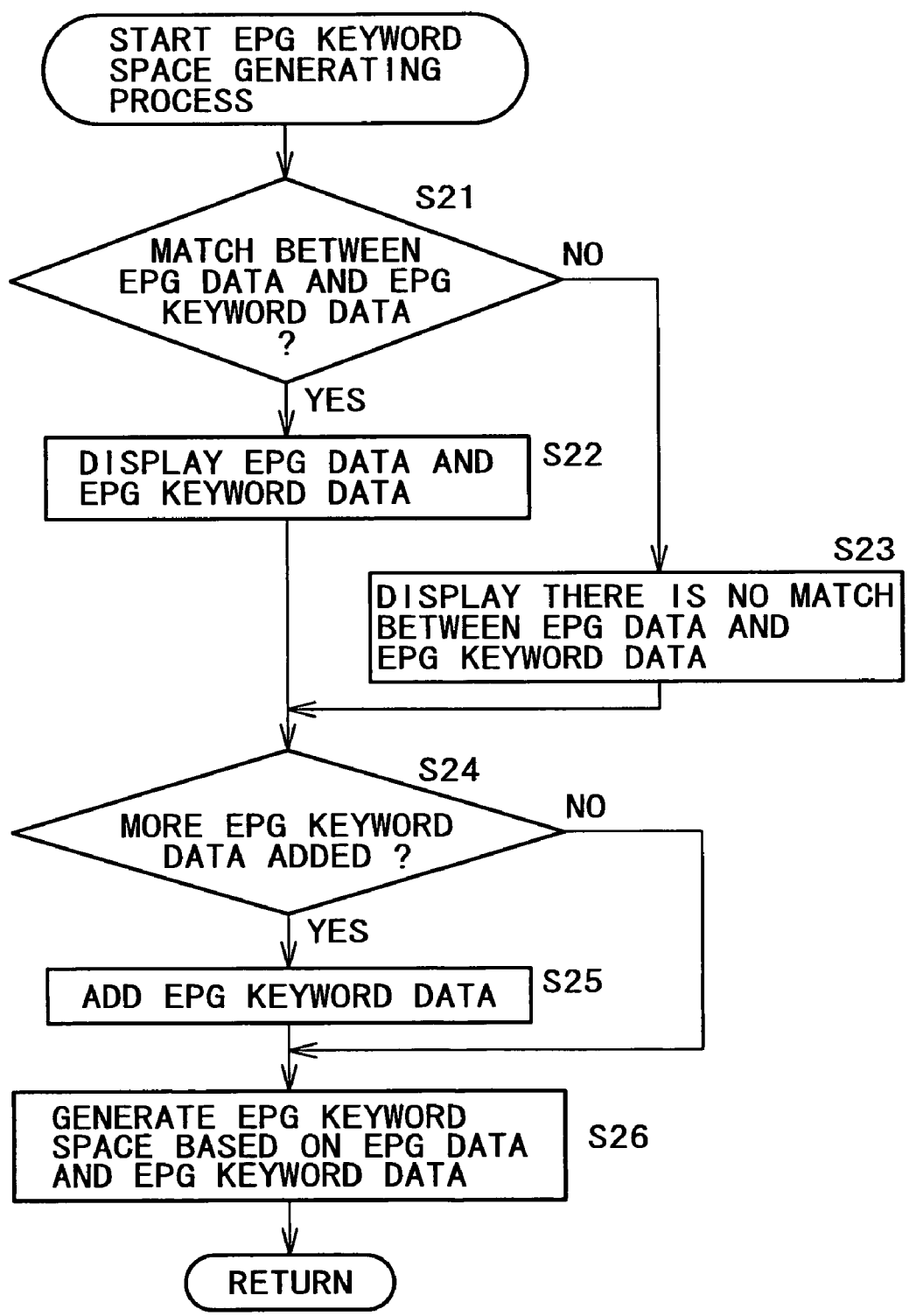
FIG. 13 is a flowchart of steps constituting an EPG keyword space generating process of step S3 in FIG. 12.

In step S3, the EPG keyword space generation section 143 carries out an EPG keyword space generating process% This process is described hereunder by referring to the flowchart of FIG. 13.

In step S21 of FIG. 13, the EPG keyword space generation section 143 compares the EPG data from the EPG data acquisition section 142 with the EPG keyword data from the EPG keyword data acquisition section 141 for matching. In the case of a match, step S22 is reached. In step S22, the EPG keyword space generation section 143 causes the output section 97 to display on its monitor the EPG keyword data deemed to match with the EPG data.

If in step S21 no match is found between the EPG data and the EPG keyword data (i.e., if there is no EPG keyword data matching with the EPG data), then step S23 is reached. In step S23, the EPG keyword space generation section 143 causes the output section 97 to display on its monitor a screen indicating there exist no EPG keyword data matching with the EPG data.

The administrator of the server 23 may wish to add other EPG keyword data when viewing the EPG data and EPG keyword data displayed in step S22, or when looking at the screen saying there exist no EPG keyword data matching with the EPG data in step S23. In either case, the administrator enters other EPG keyword data through the input section 96.

In step S24, the EPG keyword space generation section 143 checks whether EPG keyword data is input with regard to the EPG data. If EPG keyword data is found to be input, step S25 is reached. In step S25, the EPG keyword space generation section 143 adds the EPG keyword data. The EPG keyword data added here may be stored into the EPG keyword database 161 by the EPG keyword data acquisition section 141 for use at the next EPG data update.

If in step S24 no EPG keyword data is found to be input with respect to the EPG data, then step S25 is skipped.

In step S26, the EPG keyword space generation section 143 generates an EPG keyword space 45 based on the EPG data and on the EPG keyword data corresponding to the EPG data (including the EPG keyword data added in step S25).

Figure 12:
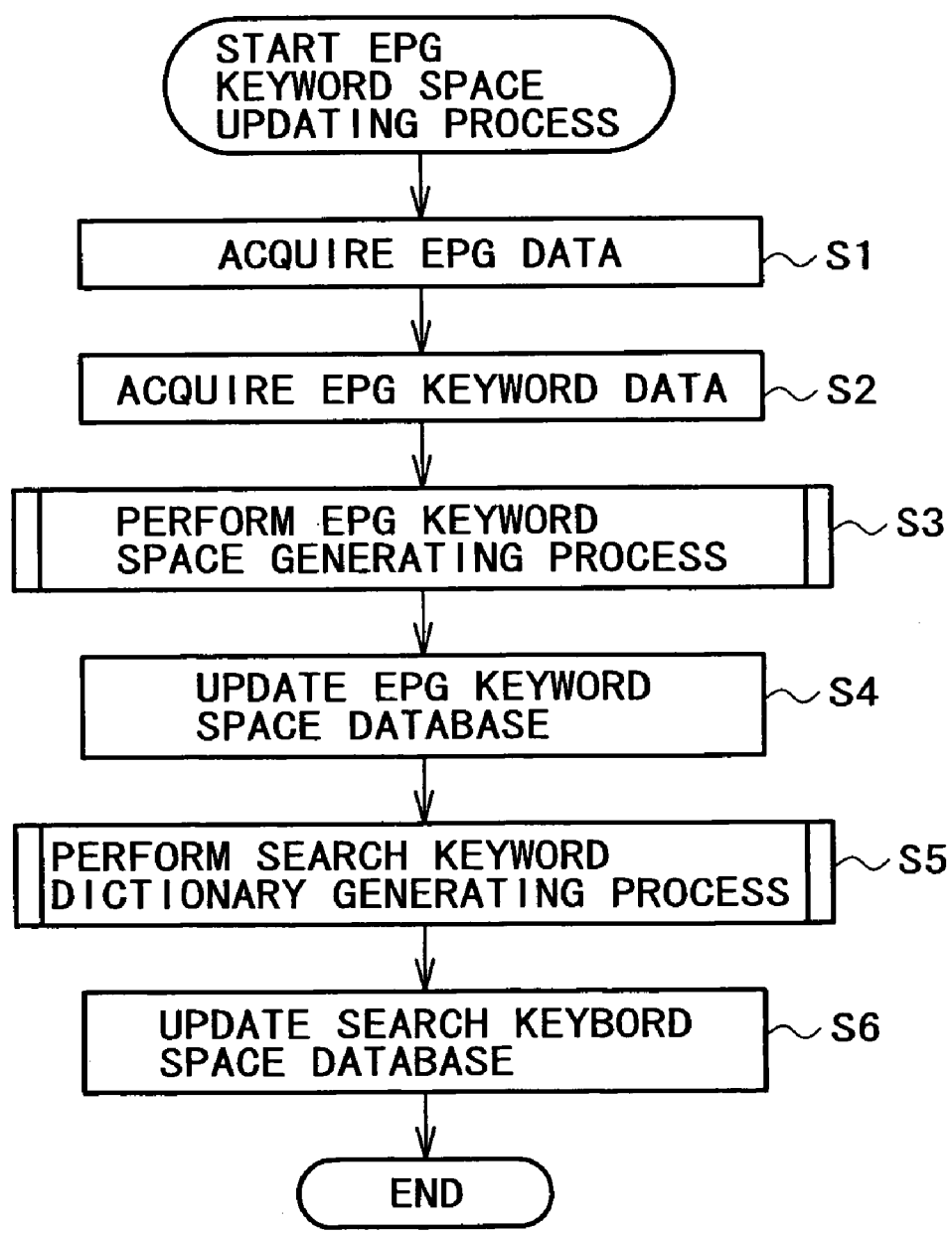
FIG. 12 is a flowchart of steps constituting an EPG keyword space updating process performed by the server in FIG. 2.

In step S4 of FIG. 12, the EPG keyword space recording section 144 records the generated EPG keyword space 45 into the EPG keyword space database 163. This action updates the EPG keyword space database 163.

Figure 14:
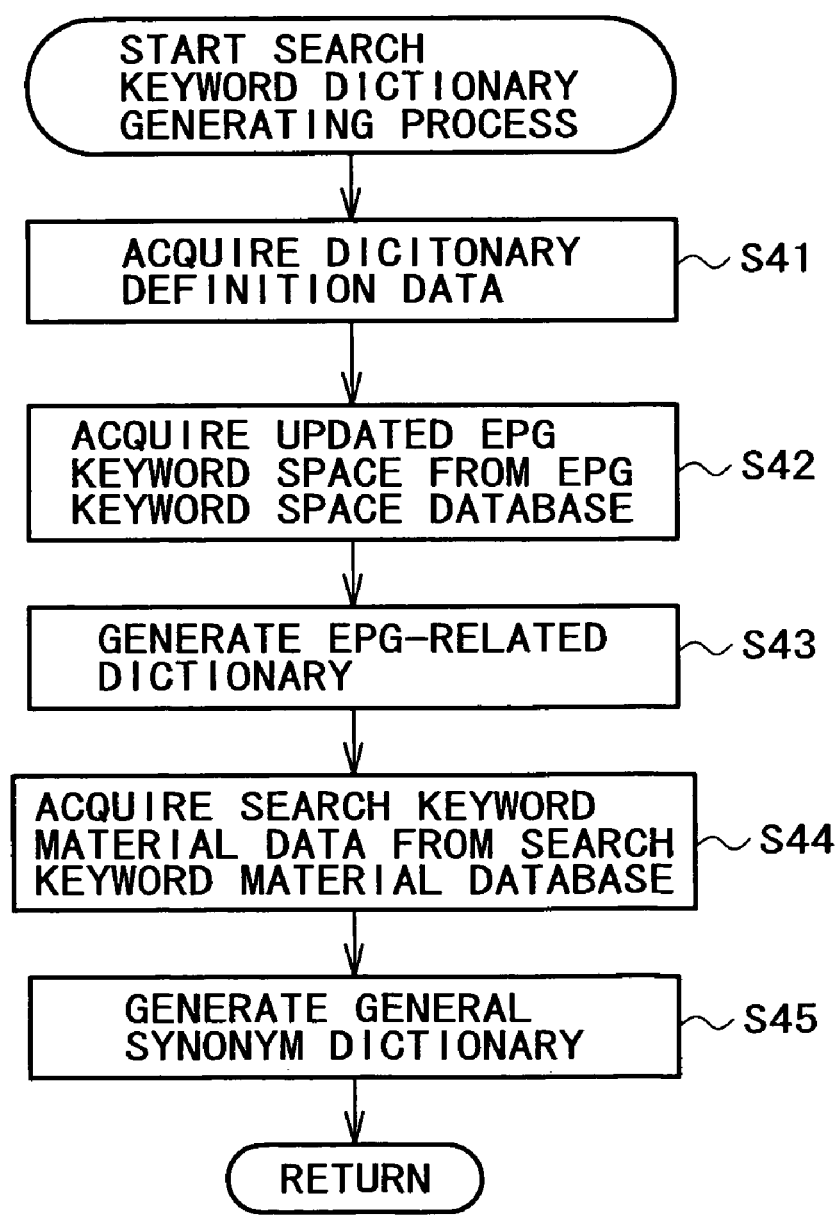
FIG. 14 is a flowchart of steps constituting a search keyword dictionary generating process of step S5 in FIG. 12.

In step S5, the search dictionary processing section 102 performs a search keyword dictionary generating process based on the generated EPG keyword space 45. How this process is carried out will now be described with reference to the flowchart of FIG. 14.

In step S41, the search keyword dictionary generation section 153 acquires dictionary definition data 203 from the search keyword dictionary database 165. In step S42, the EPG keyword acquisition section 151 acquires from the EPG keyword space database 163 the EPG keyword data and EPG data included in the newly recorded EPG keyword space 45. The acquired data is sent to the search keyword dictionary generation section 153.

In step S43, the search keyword dictionary generation section 153 adds the acquired EPG keyword data and EPG data according to the dictionary definition data 203, thereby generating the component dictionaries constituting the EPG-related dictionary 202.

In step S44, the search keyword material acquisition section 152 acquires search keyword material data from the search keyword material database 164, and supplies the acquired data to the search keyword dictionary generation section 153. In step S45, the search keyword dictionary generation section 153 generates a general synonym dictionary 201 based on the acquired search keyword material data.

If no new search keyword material data is added to the search keyword material database 164, then steps S44 and S45 may be skipped.

In step S6 of FIG. 12, the search dictionary recording section 154 records into the search keyword dictionary database 165 either the EPG-related dictionary 202 generated in step S43 or the general synonym dictionary 201 generated in step S45. This action updates the search keyword dictionary database 165.

As described above, the EPG keyword space database 163 is updated as needed in keeping with the EPG data, and the search keyword dictionary database 165 is updated on the basis of the updated EPG keyword space database 163. This makes it possible for the server 23 to be always in possession of the up-to-date EPG keyword space database 163 or search keyword dictionary database 165.

Figure 15:
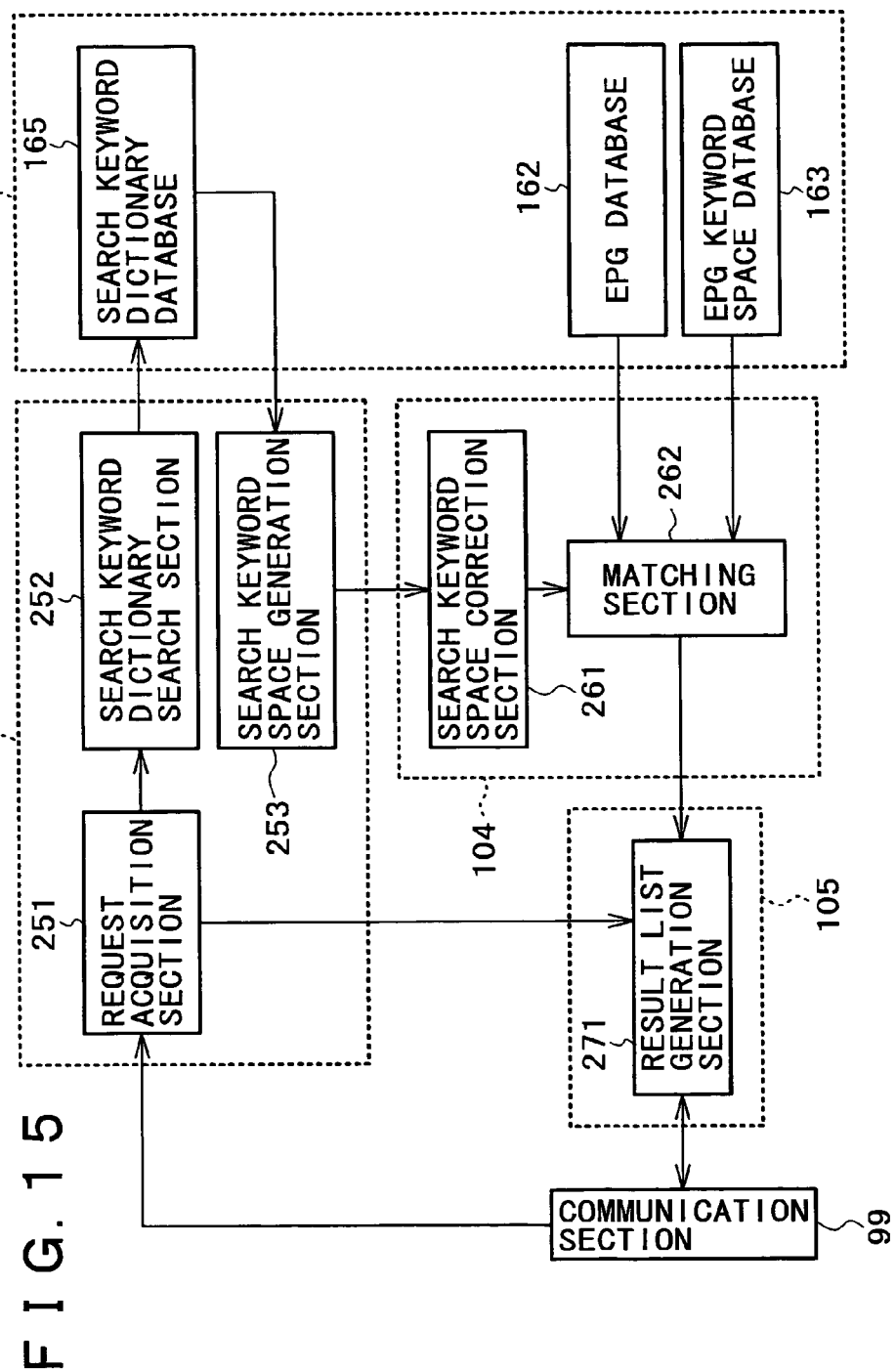
FIG. 15 is a block diagram showing another typical functional structure of the server in FIG. 2.

Described below with reference to FIG. 15 is the search function of the server 23 utilized by the user who, in possession of the user terminal 21, searches the server 23 for desired broadcast content. FIG. 15 is a block diagram showing another typical functional structure of the server 23. The function blocks shown in the structure of FIG. 15 are implemented by the CPU 91 carrying out corresponding control programs. Of the function blocks in FIG. 15, those with their counterparts appearing in FIG. 6 are given the same reference numerals and their descriptions are omitted where redundant.

The search space processing section 103 is made up of a request acquisition section 251, a search keyword dictionary search section 252, and a search keyword space generation section 253. The search processing section 104 is formed by a search keyword space correction section 261 and a matching section 262. The search display processing section 105 is constituted by a result list generation section 271. The database 100 includes an EPG database 162, an EPG keyword space database 163, and a search keyword dictionary database 165.

The request acquisition section 251 acquires search information sent from the user terminal 21 via the communication section 99. The search information is composed of at least one search keyword, as well as a search condition and/or a search result display condition. The request acquisition section 251 acquires the search keyword 41 from the search information.

The search keyword dictionary search section 252 receives the search keyword 41 from the request acquisition section 251, and searches the search keyword dictionary database 165 for search-related keyword data (related information) associated with the search keyword 41. The search keyword space generation section 253 generates a search keyword space 43 based on the search-related keyword data supplied from the search keyword dictionary database 165.

The search keyword space correction section 261 corrects the generated search keyword space 43. The correcting process specifically involves adding, as search-related keyword data, variable notations of the search keyword 41 making up the search keyword space 43 or of the search-related keyword data. As examples of the variable notations to be added, "violin" and "biolin" are considered equivalent, and so are "A. Smith" and "A Smith."

The matching section 262 matches the corrected search keyword space 43 with the EPG data in the EPG database 162 and with the EPG keyword space 45 in the EPG Keyword space database 163.

The result list generation section 271 receives through the request acquisition section 251 a search display condition as part of the search information coming from the user terminal 21. Based on the search display condition, the result list generation section 271 narrows down the content information resulting from the matching so as to generate a result list display screen. The generated screen is transmitted to the user terminal 21 through the communication section 99.

A broadcast content searching process performed by the server 23 will now be described with reference to the flowchart of FIG. 16. Through the input section 66 of the user terminal 21, the user enters search information by which to search for broadcast content (EPG data). The CPU 61 causes the communication section 69 to transmit the search information to the server 23 over the network 22.

In step S121, the CPU 91 of the server 23 controls the communication section 99 to receive the search information. In step S122, the request acquisition section 251 acquires a search keyword 41 from the received search information, and supplies the acquired keyword 41 to the search keyword dictionary search section 252.

In step S123, the search space processing section 103 performs a search keyword space generating process. How this process is illustratively carried out is described hereunder with reference to the flowchart of FIG. 17.

Figure 18:
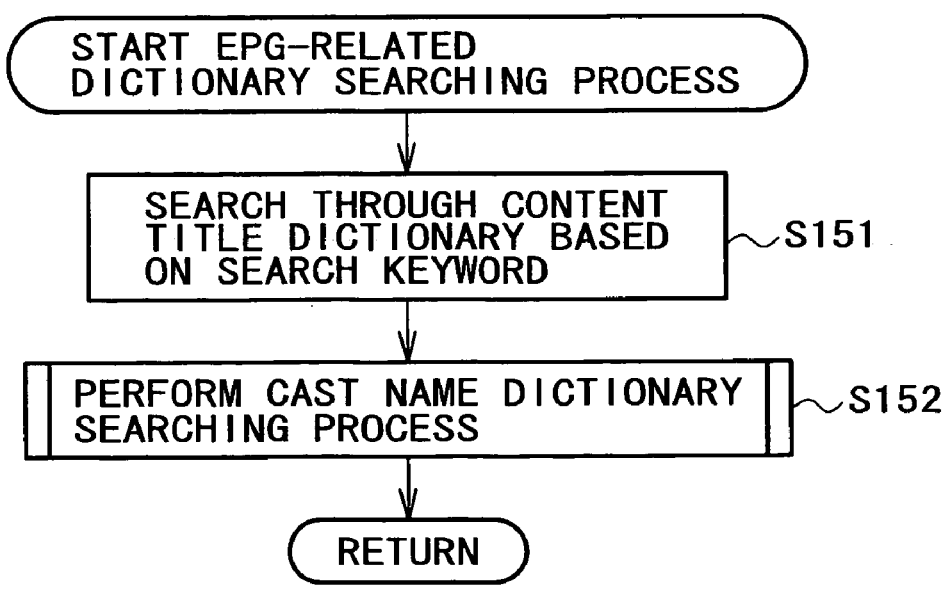
FIG. 18 is a flowchart of steps constituting an EPG-related dictionary searching process of step S141 in FIG. 17.

In step S141, the search keyword dictionary search section 252 searches through the EPG-related dictionary 202 in the search keyword dictionary database 165. The process of searching through the EPG-related dictionary 202 is discussed below with reference to the flowchart of FIG. 18.

In step S151, the search keyword dictionary search section 252 searches the content title dictionary 211 in the EPG-related dictionary 202 for the search-related keyword data associated with the search keyword 41 fed from the request acquisition section 251. In step S152, the search keyword dictionary search section 252 searches through the cast name dictionary 212 in the EPG-related dictionary 202. Described below with reference to the flowchart of FIG. 19 is the process of searching through the content title dictionary 211.

Figures 19, 20:
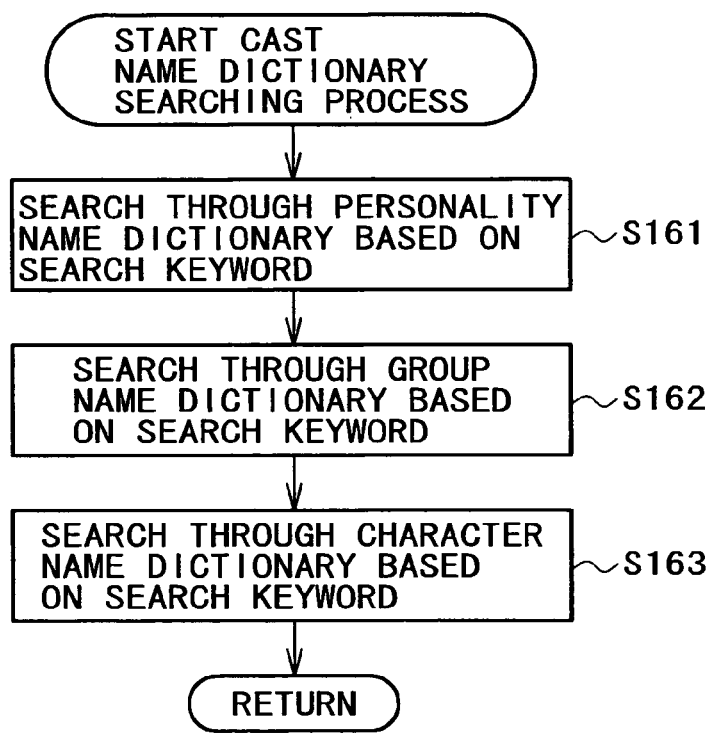
FIG. 19 is a flowchart of steps constituting a cast name dictionary searching process of step S152 in FIG. 18.
FIG. 20 is a tabular view showing a typical structure of an EPG data-related dictionary for the server in FIG. 2.

In step S161 of FIG. 19, the search keyword dictionary search section 252 searches the personality name dictionary 221 in the cast name dictionary 212 for the search-related keyword data associated with the search keyword 41 fed from the request acquisition section 251. In step S162, the search keyword dictionary search section 252 searches the group name dictionary 222 in the cast name dictionary 212 for the search-related keyword data associated with the search keyword 41. In step S163, the search keyword dictionary search section 252 searches the character name dictionary 223 in the cast name dictionary 212 for the search-related keyword data associated with the search keyword 41.

Figure 17:
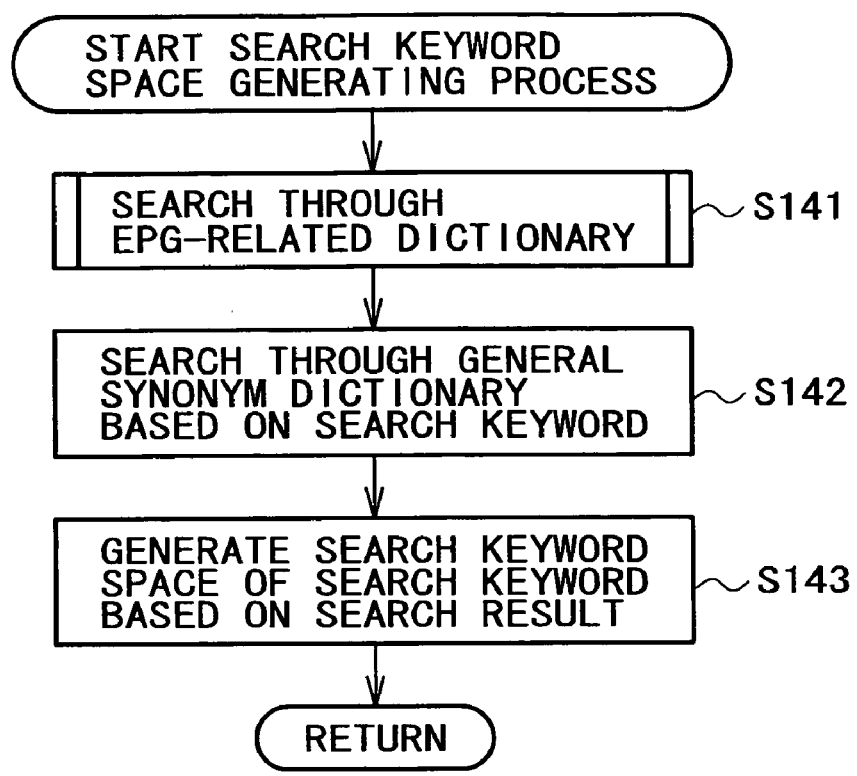
FIG. 17 is a flowchart of steps constituting a search keyword space generating process of step S123 in FIG. 16.

Later, in step S142 of FIG. 17, the search keyword dictionary search section 252 searches the general synonym dictionary 201 in the search keyword dictionary database 165 for the search-related keyword data associated with the search keyword 41.

In step S143, the search keyword space generation section 253 generates a search keyword space 43 based on the search-related keyword data retrieved in the above steps as well as on the search keyword 41.

Figure 16:
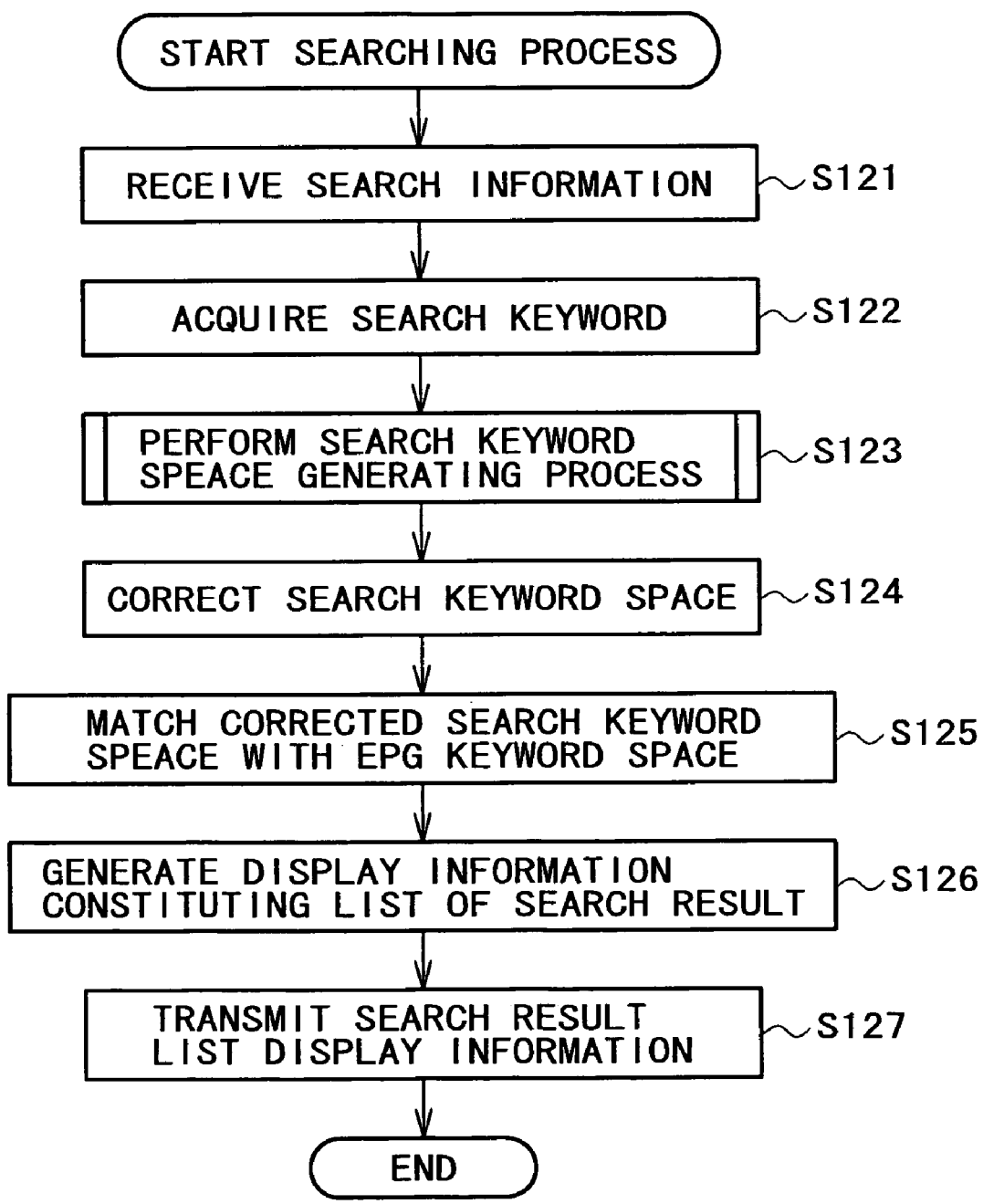
FIG. 16 is a flowchart of steps constituting a broadcast content searching process performed by the server in FIG. 2.

In step S124 of FIG. 16, the search keyword space correction section 261 corrects any variable notations in the search keyword space 43 generated by the search keyword space generation section 253.

In step S125, the matching section 262 matches the corrected search keyword space 43 with the EPG data in the EPG database 162 as well as with the EPG keyword space 45 in the EPG keyword space database 163. In practice, the matching section 262 searches the EPG data and EPG keyword space 45 for the search keyword space 43 based on the search information received from the user terminal 21. The matching section 262 outputs only the content information that includes the keyword and that has been deemed to match to the search result display processing section 105.

For example, the EPG keyword space 44 holds additional information b2 (FIG. 9A) as part of the broadcast content EPG keyword data 181 regarding all content titles related to "World news satellite." The content title dictionary 211 holds a common name "WNS," a popular name "World news," and other search-related keyword data d1 (FIG. 11A) with respect to the formal title "World news satellite." Under these conditions, a search made with the formal name "World news satellite" used as the search keyword 41 can retrieve from the EPG data all broadcast content titles carrying "World satellite news," "WNS" or "World news."

In another example, the EPG keyword space 44 holds additional information about a personality "Takiya Kimura" regarding all content titles in which "Takiya Kimura" appears (i.e., the additional information cl (FIG. 9B) is shown as part of the cast name EPG keyword data 182 regarding all broadcast content titles related to "Takiya Kimura"). The personality name dictionary 221 holds a common name "Kimutaki," a popular name "Takiya," and other search-related keyword data e2 (FIG. 11B) with respect to the formal name "Takiya Kimura." Under these conditions, a search made with the common name "Kimutaki" used as the search keyword 41 can retrieve from the EPG data all broadcast content titles carrying "Takiya Kimura" or "Kimutaki."

FIG. 20 is a tabular view showing a typical structure of another dictionary to be stored in the EPG data-related dictionary 202. In FIG. 20, the group name "SNAP" as part of search-related keyword data h1 is associated with a personality name 1 "Takiya Kimura," a personality name 2 "Ringo Katori," and a personality name 3 "Masahiro Nakata" registered as members of the group SNAP. When group names and the personality names of members belonging to these groups are stored in suitably associated relation with one another in the EPG data-related dictionary 202, a search made with, say, "Kimutaki" used as the search keyword 41 can retrieve not only the broadcast content titles carrying "Kimutaki" and "Takiya Kimura" but also the content titles containing "SNAP" and "Sunappu."

In step S126, the result list generation section 271 narrows down the matching (i.e., retrieved) content information in accordance with the search display condition as part of the search information received from the user terminal 21, thereby generating result list display screen information. In step S127, the result list generation section 271 causes the communication section 99 to transmit the result list display screen information to the user terminal 21.

In turn, the CPU 61 of the user terminal 21 controls the communication section 69 to receive the result list display screen information, and causes the output section 67 to output on its monitor a list display screen showing the content information as the result of the search.

The search display condition is a condition designated by the user upon start of a search. As in the case of general search result display screens, the condition may stipulate that the content information resulting from searches be displayed in alphabetical order of retrieved content titles or in the order of the start times at which the content titles are to be broadcast. Alternatively, a list of the content information resulting from searches may be displayed in such a manner that the retrieved search-related keyword data is incorporated into the search display condition upon generation of a search keyword space according to this invention.

For example, a search made with "Kimutaki" used as the search keyword 41 retrieves from the personality name dictionary 221 the search-related keyword data e2 (FIG. 11B) including the common name "Kimutaki" and popular name "Takiya" with regard to the formal name "Takiya Kimura." A search keyword space 43 is then generated on the basis of the search-related keyword data e2, and content information is retrieved from the search keyword space 43. Illustratively, the result of the search may be presented as six hits with the keyword "Takiya Kimura," four with "Kimutaki," and one with "Takiya." That is, the hits from the search may be displayed in descending order of the hit counts by keyword (i.e., by search keyword 41 or by search-related keyword data).

It might happen that the search keyword dictionary database 165 or EPG keyword space database 163 is supplemented with attributes representing characteristics of search keywords. If any attributes applicable to a given keyword constitute information category items helpful to the user, these data attributes may also be incorporated into the search display condition.

For example, the search keyword dictionary database 165 or EPG keyword space database 163 may include a cast role dictionary representing such attributes as "singer," "leading part" or "guest" with regard to each keyword such as "Takiya Kimura." In that case, a search made with "Kimutaki" used as the search keyword 41 may retrieve illustratively five broadcast content titles in which the personality appears as a "singer" (e.g., popular song programs), three content titles in which the personality plays the "leading part," and one broadcast content title in which the personality appears as a "guest" (e.g., a variety show or a talk show). That is, the hits from the search may be displayed in categories defined by the attributes of a given search keyword.

When the results from searches for content information are narrowed down as described above, it is possible to suppress the display of the information unnecessary for the user. Illustratively, a search made with "The United States of America" as the search keyword 41 may come up with the results attributable to diverse associative keywords derived from the search keyword dictionary database 165. These keywords may include "America," "USA," "U.S.A.," "Beikoku" (literally, the Rice Country in Japanese), and "Kome" (rice in Japanese, suggestive of the Rice Country which means in Japanese the United States). The narrowing-down process discussed above then eliminates the irrelevant hits related to "Kome" (rice). In this manner, the user of the user terminal 21 is able to acquire satisfactory results from searches.

The series of steps and processes described above may be executed either by hardware or by software. For the software-based processing to take place, the programs constituting the software may be either incorporated beforehand in dedicated hardware of a computer or installed upon use from a suitable program storage medium into a general-purpose personal computer or like equipment capable of executing diverse functions based on the installed programs.

As shown in FIG. 5, the program storage medium is offered to users either as a package medium constituted by the magnetic disk 111 (including flexible discs), optical disk 112 (including CD-ROM (compact disc-read only memory) and DVD (digital versatile disc)), magneto-optical disk 113 (including MD (Mini-disc; trademark)), or semiconductor memory 114; or in the form of the ROM 92 or the storage section 98 which contains the programs temporarily or permanently.

In this description, the steps which describe the programs stored on the program storage medium represent not only the processes that are carried out in the depicted sequence (i.e., on a time series basis) but also processes that may be performed parallelly or individually.

In this description, the term "system" refers to an entire configuration made up of a plurality of component devices.

Industrial Applicability

As described, the apparatus and method according to the invention easily provide users with their expected results of searches for desired broadcast content. The inventive apparatus and method also present the results of searches in a manner that optimally suits the users' purposes.

The invention claimed is:

1. An information processing apparatus comprising:
first generating means for generating a content information space based on content information and on additional information related to said content information;
receiving means for receiving search information from an information processing terminal over a network;
first acquiring means for acquiring a search keyword from said search information received by said receiving means;
wherein the first acquiring means further acquires at least an attribute associated with the search keyword from the search information, and when the search keyword indicates a name of a cast, the attribute includes information indicating whether the cast plays a leading role or a guest role in a program;
searching means for searching a search-related information database for information related to said search keyword acquired by said first acquiring means;
second generating means for generating a search keyword space based on said related information retrieved by said searching means and on said search keyword;
correcting means for correcting and adding variable notations in the search keyword space, the added variable notations making at least two words whose spellings are different in only one character to be equivalent;
comparing means for comparing information in said content information space generated by said first generating means with information in said corrected search keyword space generated by said second generating means;
preparing means for preparing a list of display-ready information from the information deemed to match as a result of the comparison by said comparing means; and
transmitting means for transmitting said list of display-ready information prepared by said preparing means to said information processing terminal,
wherein the search-related information database includes a general synonym database, a content title database, and a cast name database,
wherein the general synonym database holds general synonym data; the content title database holds a formal title and a popular title of a broadcast content; and the cast name database further includes a formal name and a popular name of a cast of a broadcast content, and
wherein when a name of a cast is input as a search key word, the second generation means adds a formal name, a popular name, and a common name of the cast into the search keyword space.

2. An information processing apparatus according to claim 1, further comprising updating means for updating said search-related information database on the basis of said content information space generated by said first generating means.

3. An information processing apparatus according to claim 1, wherein said preparing means prepares said list of display-related information from the matching information derived from the comparison by said comparing means, in accordance with said search information.

4. An information processing apparatus according to claim 1, further comprising second acquiring means for acquiring said content information from another information processing apparatus over said network.

5. An information processing method comprising:
a first generation step of generating a content information space based on content information and on additional information related to said content information;
a reception step of receiving search information from an information processing terminal over a network;
an acquisition step of acquiring a search keyword from said search information received in said reception step;
wherein the acquisition step further acquires at least an attribute associated with the search keyword form the search information, and when the search keyword indicates a name of a cast, the attribute includes information whether the cast plays a leading role or a guest role in a program;
a search step of searching a search-related information database for information related to said search keyword acquired by in said acquisition step;
a second generation step of generating a search keyword space based on said related information retrieved in said search step and on said search keyword;
a correcting step of correcting and adding variable notations in the search keyword space, the added variable notations making at least two words whose spellings are different in only one character to be equivalent;
a comparison step of comparing information in said content information space generated in said first generation step with information in said corrected search keyword space generated in said second generation step;
a preparation step of preparing a list of display-ready information from the information deemed to match as a result of the comparison in said comparison step; and
a transmission step of transmitting said list of display-ready information prepared in said preparation step to said information processing terminal,
wherein the search-related information database includes a general synonym database, a content title database, and a cast name database, wherein the general synonym database holds general synonym data; the content title database holds a formal title and a popular title of a broadcast content; and the cast name database further includes a formal name and a popular name of a cast of a broadcast content, and wherein when a name of a cast is input as a search key word, the second generation step adds a formal name, a popular name, and a common name of the cast into the search keyword space.

6. A non-transitory recording medium which records a program in a computer-readable format, said program comprising:

a first generation step of generating a content information space based on content information and on additional information related to said content information;

a reception controlling step of receiving search information from an information processing terminal over a network;

an acquisition step of acquiring a search keyword from said search information received in said reception controlling step;

wherein the acquisition step further acquires at least an attribute associated with the search keyword from the search information, and when the search keyword indicates a name of a cast, the attribute includes information indicating whether the cast plays a leading role or a guest role in a program;

a search step of searching a search-related information database for information related to said search keyword acquired by in said acquisition step;

a second generation step of generating a search keyword space based on said related information retrieved in said search step and on said search keyword;

a correcting step of correcting and adding variable notations in the search keyword space, the added variable notations making at least two words whose spellings are different in only one character to be equivalent;

a comparison step of comparing information in said content information space generated in said first generation step with information in said corrected search keyword space generated in said second generation step;

a preparation step of preparing a list of display-ready information from the information deemed to match as a result of the comparison in said comparison step; and a transmission controlling step of transmitting said list of display-ready information prepared in said preparation step to said information processing terminal, wherein the search-related information database includes a general synonym database, a content title database, and a cast name database, wherein the general synonym database holds general synonym data; the content title database holds a formal title and a popular title of a broadcast content; and the cast name database further includes a formal name and a popular name of a cast of a broadcast content, and wherein when a name of a cast is input as a search key word, the second generation step adds a formal name, a popular name, and a common name of the cast into the search keyword space.

* * * * *